United States Patent [19]
Pearce

[11] Patent Number: 6,039,494
[45] Date of Patent: Mar. 21, 2000

[54] CASING BOARD INCLUDING CLEAR OVERLAY DEFINING EXTERIOR POCKET

[76] Inventor: Jerry W. Pearce, 2649 Cherry La., Denver, N.C. 28037

[21] Appl. No.: 09/093,329

[22] Filed: Jun. 8, 1998

[51] Int. Cl.[7] ............................. B42D 3/02; B32B 31/18
[52] U.S. Cl. ................. 402/73; 402/70; 402/71; 412/3; 412/5; 281/29; 281/37; 206/387
[58] Field of Search ...................... 402/70, 71, 73–78, 402/80; 281/15, 1, 22, 28, 29, 31, 44, 45; 412/1, 3, 5; 206/387, 459, 472, 339

[56] References Cited

U.S. PATENT DOCUMENTS

| | | | |
|---|---|---|---|
| 2,801,115 | 7/1957 | Federbush et al. | 281/31 |
| 3,215,450 | 11/1965 | Peterson et al. | 281/29 |
| 3,953,056 | 4/1976 | Roberts | 281/29 |
| 4,407,410 | 10/1983 | Graetz et al. | 206/339 |
| 4,555,290 | 11/1985 | Graetz et al. | 156/245 |
| 4,629,349 | 12/1986 | Pitts | 402/74 |
| 4,718,550 | 1/1988 | Johnson | 206/387.13 |
| 4,743,049 | 5/1988 | Wiberg | 281/31 |
| 4,771,886 | 9/1988 | Johnson | 206/387.13 |
| 4,991,767 | 2/1991 | Wyant | 229/1.5 R |
| 5,030,027 | 7/1991 | Bachrach et al. | 402/4 |
| 5,069,568 | 12/1991 | Acker | 402/73 |
| 5,160,209 | 11/1992 | Schuessler | 402/75 |
| 5,605,227 | 2/1997 | Morita | 206/387.1 |
| 5,609,250 | 3/1997 | Moser | 206/387.13 |
| 5,626,940 | 5/1997 | Selwyn-Smith | 428/102 |
| 5,711,627 | 1/1998 | Chapman | 402/3 |
| 5,876,143 | 3/1999 | Ong | 281/3 |
| 5,931,505 | 8/1999 | Malpass et al. | |

*Primary Examiner*—Willmon Fridie, Jr.
*Assistant Examiner*—Alisa L Thurston
*Attorney, Agent, or Firm*—Christopher C. Dremann, PC; Christopher C. Dremann

[57] ABSTRACT

A casing board for organizing, storing, protecting and displaying communications media, such as papers, audio and video cassettes and compact discs, includes a substrate made of a relatively rigid material. The substrate includes a front cover portion, a rear cover portion and a spine portion positioned between and hingedly connected to the front cover portion and the rear cover portion. The casing board further includes an outer wrap made of a flexible, polyolefin material and sized to have longitudinal and lateral dimensions slightly greater than the longitudinal and lateral dimensions of the substrate. The outer wrap is positioned adjacent the exterior surface of the substrate with the longitudinal and lateral edges of the outer wrap turned over the periphery of the substrate and affixed, preferably with an adhesive, to the interior surface of the substrate. The casing board further includes a clear overlay made of a flexible, polyolefin material sized to have a longitudinal dimension slightly greater than the longitudinal dimension of the substrate. The clear overlay is positioned adjacent the outer wrap with the longitudinal edges of the clear overlay turned over the periphery of the substrate and affixed, preferably by thermal contact welding, to the longitudinal edges of the outer wrap. Accordingly, the clear overlay defines a transparent, exterior pocket that extends between the longitudinal edges of the casing board to display a single-sheet merchandising insert across the full width of the casing board.

14 Claims, 4 Drawing Sheets

CASING BOARD INCLUDING CLEAR OVERLAY DEFINING EXTERIOR POCKET

FIELD OF THE INVENTION

The invention relates to a casing board used in the manufacture of articles for organizing, storing, protecting and displaying communications media, such as papers, audio and video cassettes and compact discs, and a process for producing such a casing board. More particularly, the invention relates to a casing board including a substrate, an opaque outer wrap affixed to the interior surface of the substrate and a clear overlay affixed to the outer wrap and defining a transparent exterior pocket for displaying a single-sheet merchandising insert.

BACKGROUND OF THE INVENTION

Numerous examples of articles for organizing, storing, protecting and displaying communications media, such as papers, audio and video cassettes, compact discs and the like, are known. Common examples include portfolios, folders, notebooks, loose-leaf binders, audio and video cassette cases and compact disc holders. Although different in many respects, these articles share a salient feature of manufacture. Namely, each of these articles may be manufactured using a casing board that includes a substrate consisting of a front cover, a rear cover and a spine positioned between and hingedly connected to the front cover and to the rear cover along opposed, laterally extending hinge lines. Accordingly, the article can be closed to organize, store, and protect the communications media, or can be opened to display the communications media.

The manufacture of such articles has changed little in recent years. The substrate is typically made of relatively thick, relatively rigid material, such as cardboard, fiberboard or corrugated paper, which is commonly referred to as "chipboard". The chipboard is positioned between an inner cover and an outer cover made of a thin sheet of plastic material, and the inner cover and the outer cover are joined together at their edges along the periphery of the chipboard. The most well known of these articles is perhaps the conventional loose-leaf binder. Typical loose-leaf binders are shown and described in U.S. Pat. No. 5,069,568 to Acker and U.S. Pat. No. 5,030,027 to Bachrach et al. The construction of a loose-leaf binder having a retainer mechanism and an exterior display pocket is disclosed in the Bachrach patent and in U.S. Pat. No. 2,801,115 to Federbush et al.

The loose-leaf binders disclosed in the Acker, Bachrach and Federbush patents are manufactured from a casing board including a substrate consisting of a front cover portion, a rear cover portion and a spine portion positioned between and hingedly connected to the front cover portion and the rear cover portion along opposed, laterally extending hinge lines. The front cover portion, rear cover portion and spine portion are separately formed and sandwiched between an inner cover and an outer cover. The inner cover and the outer cover may be made of a thin sheet of any fabric, paper or plastic material, but most commonly are made of a thermoplastic material, such as vinyl, that is readily joined at the edges of the inner and outer covers along the periphery of the substrate by electronic welding, such as ultrasonic or radio frequency (RF) welding.

Casing boards made of thin sheets of vinyl joined along laterally extending hinge lines and along the periphery of the substrate present certain disadvantages. Firstly, vinyl, and in particular polyvinylchloride (PVC), is an environmentally unfriendly material. Vinyl materials decompose slowly in landfills and leach toxins as they decompose. The same toxins are released when the vinyl materials are incinerated. Accordingly, there is increasing pressure from environmentalists to utilize environmentally friendly materials, for example polyolefins, such as polypropylene and polyethylene, in the manufacture of casing boards for portfolios, folders, notebooks, loose-leaf binders, audio and video cassette cases, compact disc holders and the like.

Another disadvantage presented by casing boards made of thin sheets of vinyl is that the edges of the inner cover and the outer cover must be joined by electronic welding techniques (i.e. ultrasonic or RF). Thin sheets of vinyl are not susceptible to thermal welding (also know as heat sealing or thermo-welding) because vinyl materials have a relatively low softening temperature. Thus, vinyl materials tend to liquify and adhere to the thermal welding dies before the edges of the inner cover and the outer cover plasticize and fuse. RF welding, which is the most common type of electronic welding used in the manufacture of casing boards for loose-leaf binders, requires the RF energy to be applied to both the inner cover and the outer cover simultaneously to form each weld seam. Thus, RF welding results in sharp edges along the periphery of the binder. Furthermore, because the RF energy cannot penetrate the thickness of the substrate, the front cover portion, the rear cover portion and the spine portion must be separately formed to permit the inner cover and the outer cover to be welded along the opposed, laterally extending hinge lines which join the front cover portion and the rear cover portion to the spine portion.

Another disadvantage is that thin sheets of vinyl are somewhat brittle, particularly when subjected to temperature extremes. Thus, the sharp edges along the periphery tend to cold-crack and split. When the edges of the binder split, the inner cover and the outer cover separate. Because vinyl materials do not adhere well to chipboard, the inner cover and the outer cover typically are not affixed to the interior and exterior surfaces, respectively, of the substrate. Once the edges separate, the inner cover and the outer cover of the binder are likely to rip or tear away from the substrate. The inability of vinyl materials to adhere well to chipboard also results in air being entrapped between the inner cover and the substrate, and between the outer cover and the substrate. In addition to the danger presented by the sharp edges of the casing board, the sharp edges and air pockets which result from the RF welding process diminish the aesthetic appearance of the finished article.

Using electronic welding techniques, and in particular RF welding, to produce articles such as loose-leaf binders also results in increased material and manufacturing costs. As previously mentioned, RF welding requires the front cover portion, the rear cover portion and the spine portion to be separately formed, thereby adding cutting and positioning steps to the process as well as the two additional welding steps needed to form the opposed, laterally extending hinge lines. Polyolefin materials, and in particular thin sheets of polypropylene, are lighter in weight and stronger than thin sheets of vinyl having the same thickness. Accordingly, the sheets of polypropylene used to manufacture casing boards may be thinner than required when sheets of vinyl are used. Furthermore, and perhaps most importantly, RF welding requires a dwell period to generate enough heat to plasticize and fuse vinyl materials. Thus, RF welding the periphery and hinge lines of casing boards made of vinyl materials is not a continuous process. In contrast, thermal welding casing boards made of polyolefin materials is a substantially continuous process. Accordingly, the manufacture of articles such as loose-leaf binders by thermal welding is faster and is suitable for fully automatic, high speed production.

A final disadvantage of casing boards made of thin sheets of vinyl is that the use of electronic welding, and in particular RF welding, diminishes the aesthetic appearance of the finished article. As previously mentioned, RF welding results in sharp edges and possibly air pockets being introduced during the manufacture of the article. Even if the air pockets are eliminated, for example by welding in a vacuum chamber or drawing a continuous vacuum on the casing board during the welding process, the inner and outer covers are not affixed to the substrate and thus may become wrinkled as the article ages. Finally, and of great importance to the wholesale purchaser, vinyl materials are not readily receptive to printed indicia. Although it is possible to print on vinyl, anything as sophisticated as four-color graphic printing, is cost prohibitive and is not durable enough to withstand ordinary use without fading, blurring or rubbing off. Accordingly, many such articles are provided with a clear overlay which defines an exterior pocket for receiving a merchandising insert having the desired indicia printed thereon.

Casing boards made of thin sheets of vinyl materials RF welded together along opposed, laterally extending hinge lines, however, necessarily result in the formation of three separate exterior pockets, one each adjacent the front cover portion, the rear cover portion and the spine portion. Accordingly vinyl RF welded casing boards require the use of separate merchandising inserts to display printed indicia across the full-width of the outside surface between the longitudinal edges of the casing board. For example, it is not possible to display a single-sheet merchandising insert on a loose-leaf binder make of thin sheets of vinyl that are joined together along the hinge lines and the periphery of the substrate by RF welding.

Some of the disadvantages of manufacturing a casing board wherein the edges of the inner and outer covers are electronically welded along the hinge lines and the periphery of the substrate have been addressed by utilizing polyolefin materials, and specifically thin sheets of polyethylene and polypropylene, in a process commonly referred to as "turned-edge construction". Thin sheets of polyolefin materials can be readily affixed to the chipboard substrate with an adhesive and can be readily affixed to other thin sheets of polyolefin materials by thermal contact welding. In turned-edge construction, the outer cover, known as the "outer wrap" of the binder, has longitudinal and lateral dimensions that are slightly greater than the longitudinal and lateral dimensions of the substrate.

The outer wrap is positioned adjacent the exterior surface of the substrate such that the longitudinal and lateral edges of the outer wrap extend beyond the periphery of the substrate. The longitudinal and lateral edges of the outer wrap are then turned over the periphery of the substrate and affixed, typically with an adhesive, to the interior surface of the substrate. The outer wrap may also be affixed to the exterior surface of the substrate with an adhesive to eliminate wrinkles and air pockets on the front cover portion, rear cover portion and spine portion. In some cases, a liner made of a thin sheet of polyolefin material is also affixed to the interior surface of the substrate so that the substrate is completely encased by the outer wrap and the liner.

Previous attempts to provide turned-edge casing boards made of thin sheets of polyolefin materials including a clear overlay which defines a single exterior pocket have been unsuccessful. Because they are monomers, polyolefin materials are not readily receptive to RF welding. The molecules within the thin sheets do not vibrate rapidly enough to generate enough heat to permit the polyolefin materials to plasticize and fuse. As previously stated, however, polyolefin materials are receptive to thermal welding. Thus, turned-edge casing boards made of thin sheets of polypropylene, for example, are able to realize the previously described advantages of thermal welding.

It is now apparent that a casing board used in the manufacture of articles for organizing, storing, protecting and displaying commemorative media is needed that includes a clear overlay which defines a transparent exterior pocket for displaying a single-sheet merchandising insert. Accordingly, it is the principle object of the invention to provide a casing board including a clear overlay which defines a transparent exterior pocket and a process for producing such a casing board. Although the preferred embodiments of the invention are described herein in connection with a casing board used in the manufacture of a loose-leaf binder and an audio cassette case, it is emphasized that the principles of the invention apply equally to casing boards used to manufacture similar articles such as portfolios, folders, notebooks, video cassette cases, compact disc holders, game boards and the like.

SUMMARY OF THE INVENTION

The invention is a casing board of the type used in the manufacture of articles for organizing, storing, protecting and displaying communications media, such as papers, audio and video cassettes, and compact discs, and a process for producing such a casing board. The casing board includes a substrate, an opaque outer wrap and a clear overlay which defines a transparent exterior pocket for displaying a single-sheet merchandising insert having printed indicia thereon. The casing board is made of environmentally friendly materials, is less costly to manufacture and is more aesthetic than similar articles made of vinyl materials and utilizing electronic welding techniques. Further, the transparent exterior pocket defined by the clear overlay permits a single-sheet merchandising insert having printed indicia thereon to be displayed across the full width of the substrate between the longitudinal edges of the casing board.

The substrate of the casing board is made of a relatively rigid material and includes a front cover portion, a rear cover portion and a spine portion. The spine portion of the substrate is positioned between and hingedly connected to the front cover portion and to the rear cover portion along opposed, laterally extending hinge lines. Preferably, the front cover portion, the rear cover portion and the spine portion of the substrate are integrally formed and the hinge lines are provided between the spine portion and the front cover portion and between the spine portion and the rear cover portion. The hinge lines may be formed by any known process, including but not limited to, routing, stamping or scoring the substrate laterally along the opposed sides of the spine portion. Regardless, the substrate has a generally rectangular shape and includes an exterior surface, an interior surface opposite the exterior surface and a periphery defined by the longitudinal and lateral edges of the substrate.

The outer wrap of the casing board is made of a flexible polyolefin material, such as a thin sheet of polyethylene or polypropylene. Most preferably, the outer wrap is made of a thin sheet of opaque polypropylene. The outer wrap is sized such that it has longitudinal and lateral dimensions that are slightly greater than the longitudinal and lateral dimensions of the substrate. The outer wrap is positioned adjacent the exterior surface of the substrate with the longitudinal and lateral edges of the outer wrap extending beyond the periphery of the substrate. The edges of the outer wrap are turned over the periphery of the substrate and affixed to the interior surface of the substrate in a known manner, preferably with an adhesive. The remainder of the outer wrap may also be affixed to the exterior surface of the substrate, preferably with an adhesive, to eliminate any wrinkles or air pockets between the substrate and the outer wrap.

The clear overlay of the casing board is likewise made of a flexible polyolefin material, such as a thin sheet of polyethylene or polypropylene. Most preferably, the clear overlay is made of a thin sheet of transparent polypropylene. The clear overlay is sized such that it has a longitudinal dimension that is slightly greater than the longitudinal dimension of the substrate, and a lateral dimension that is slightly less than the lateral dimension of the substrate. The clear overlay is positioned adjacent the outer wrap on the exterior surface of the substrate with the longitudinal edges of the clear overlay extending beyond the longitudinal edges of the substrate, and with the lateral edges of the clear overlay within the lateral edges of the substrate. The longitudinal edges of the clear overlay are turned over the periphery of the substrate and affixed to the longitudinal edges of the outer wrap on the interior surface of the substrate.

The longitudinal edges of the clear overlay may be affixed to the longitudinal edges of the outer wrap with a suitable adhesive. Preferably, however, the longitudinal edges of the clear overlay are affixed to the longitudinal edges of the outer wrap by thermal contact welding. Thus, the clear overlay defines a transparent exterior pocket that extends between the longitudinal edges of the casing board. Accordingly, a single-sheet merchandising insert can be displayed across the full width of the substrate (i.e. the insert extends from the front cover portion across the spine portion to the rear cover portion of the substrate). The clear overlay may be positioned with one of the lateral edges, and preferably the lower lateral edge, extending beyond the periphery of the substrate. The lower lateral edge of the clear overlay is then affixed in a similar manner to the lower lateral edge of the outer wrap on the interior surface of the substrate, thereby forming a transparent exterior pocket that is closed on three sides. The three-sided exterior pocket likewise permits a single-sheet merchandising insert of any suitable weight paper to be inserted in the pocket adjacent the entire exterior surface of the substrate across the full width of the casing board.

The casing board may also include a liner adjacent the interior surface of the substrate. The liner is made of a flexible material, such as any fabric, paper or plastic material, preferably, the liner is made of a thin sheet of polyolefin material, such as polyethylene or polypropylene. The liner is sized such that it has longitudinal and lateral dimensions that are slightly less than the longitudinal and lateral dimensions of the substrate. The liner is positioned adjacent the interior surface of the substrate with the longitudinal and lateral edges of the liner within the periphery of the substrate. The liner is then affixed, preferably with an adhesive, to the interior surface of the substrate.

As previously stated, the present invention provides a casing board used in manufacturing articles for organizing, storing, protecting and displaying communications media. The casing board includes a clear overlay defining an exterior pocket on the casing board. A particular example of such an article is a conventional loose-leaf binder. Another example of such an article is a conventional audio cassette. In both articles, the transparent exterior pocket defined by the clear overlay permits indicia printed on a single-sheet merchandising insert of any suitable weight paper to be displayed adjacent the entire exterior surface of the substrate across the full width of the casing board.

BRIEF DESCRIPTION OF THE DRAWINGS

The achievement of the foregoing objects, and others, will become more readily apparent by referring to the appended drawings in which.

DETAILED DESCRIPTION OF THE PREFERRED EMBODIMENTS

Figure 1:
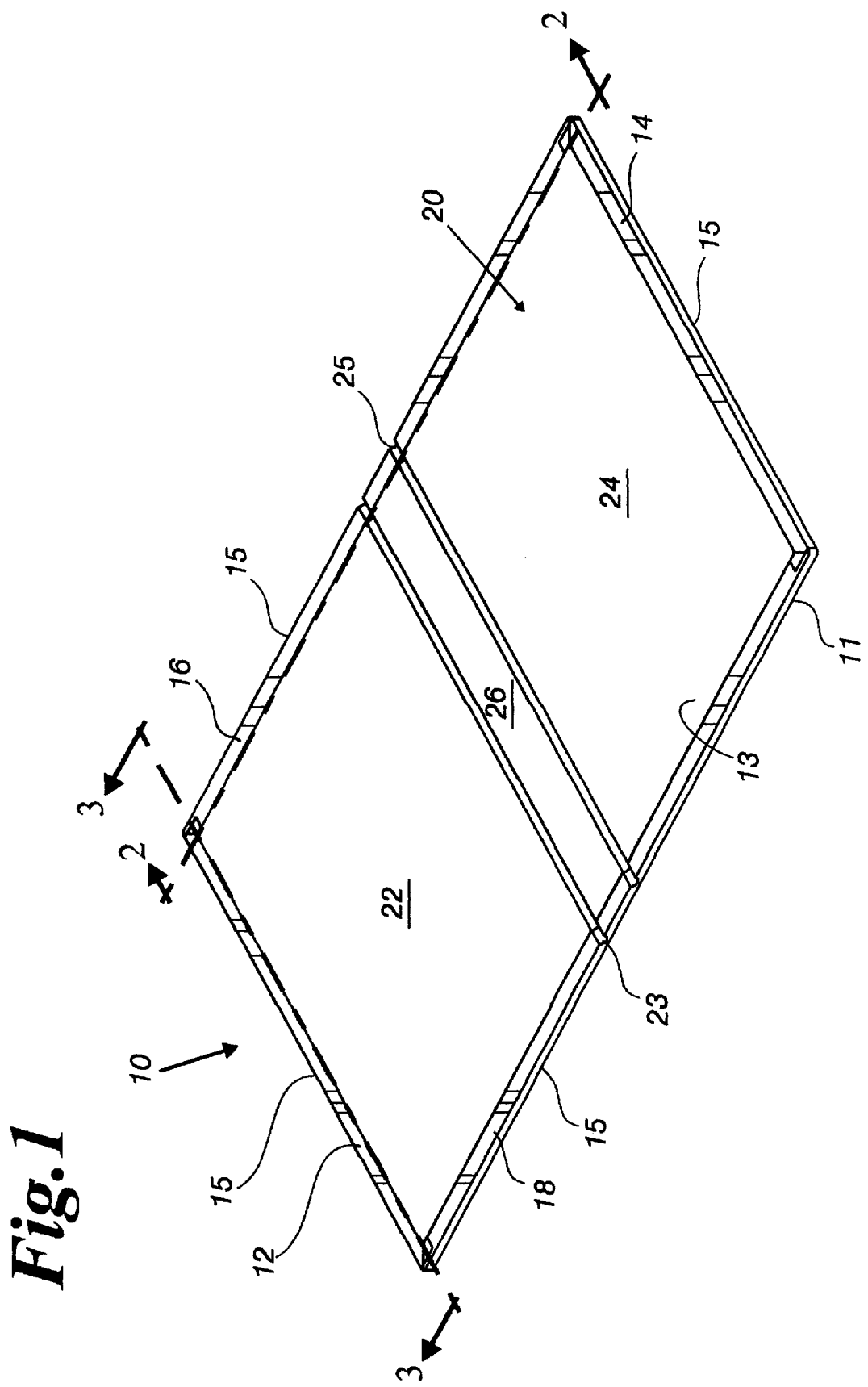
FIG. 1 is a perspective view of a preferred embodiment of a casing board according to the present invention.

Referring now to the drawings, in which like reference numerals indicate like parts, FIG. 1 is a perspective view of a casing board, indicated generally at 10, according to the present invention. The casing board 10 is used to manufacture any of a number of articles designed to organize, store, protect and display various communications media, such as papers, audio and video cassettes, and compact discs. Common examples of such products include portfolios, folders, notebooks, loose-leaf binders, audio and video cassette cases, and compact disc holders. The casing board 10, however, is not limited to the above illustrative examples and may also be used to manufacture articles such as game boards and food containers, particularly of the type having vacuum-formed trays affixed to a front cover or to a rear cover that is hingedly connected to a spine. The invention is described herein in terms of specific examples of articles manufactured using the casing board 10, namely, a conventional loose-leaf binder (FIG. 5) comprising a retainer mechanism and a conventional audio cassette case (FIG. 6) comprising one or more vacuum-formed audio cassette trays.

The casing board 10 comprises a substrate 20, an opaque outer wrap 30 (FIGS. 2 and 3) and a clear overlay 40 (FIGS. 2 and 3) which defines a transparent exterior pocket 45 (FIGS. 5 and 6) on the article to be manufactured. As best shown in FIG. 1, the substrate 20 comprises an exterior surface 11, an interior surface 13 opposite the exterior surface and a periphery 15 defined by the longitudinal edges 12, 14 and the lateral edges 16, 18, of the substrate. The outer wrap 30 is positioned adjacent the exterior surface 11 of the substrate 20 and the clear overlay 40 is positioned adjacent the outer wrap on the exterior surface of the substrate as will be described. The exterior pocket 45 defined by the clear overlay 40 extends across the full width of the substrate 20 of the casing board 10 for a purpose to be described hereinafter. The casing board 10 may further comprise a liner 50 positioned adjacent at least a portion of the interior surface 13 of the substrate 20, as will be described.

The substrate 20 is made of a relatively rigid material such as fiberboard, cardboard or corrugated paper. Preferably, the substrate 20 is made of a particular type of fiberboard manufactured for articles such as loose-leaf binders, audio and video cassette cases and game boards, commonly referred to as chipboard. The substrate 20 comprises a front cover portion 22, a rear cover portion 24 and a spine portion 26 positioned between the front cover portion and the rear cover portion. The spine portion 26 is hingedly connected to the front cover portion 22 and the rear cover portion 24 along opposed, laterally extending hinge lines 23, 25 formed on the interior surface 13 of the substrate 20. The substrate 20 may comprise a separately formed front cover portion 22, rear cover portion 24 and spine portion 26, each positioned as shown in FIG. 1 and adhered to the outer wrap 30 with a small gap between the front cover portion and the spine portion, and between the rear cover portion and the spine portion to form the hinge lines 23, 25. Preferably, however, the front cover portion 22, the rear cover portion 24 and the spine portion 26 are integrally formed from a single piece of chipboard. The hinge lines 23, 25 are formed by, for example, routing the chip board laterally between the front cover portion 22 and the spine portion 26, and between the rear cover portion 24 and the spine portion 26 in a known manner. The integrally formed substrate 20 may also be scored laterally, E tamped laterally with a rounded die, or processed by any other known manner which produces the desired hinge lines 23, 25.

The outer wrap 30 of the casing board 10 is made of a flexible polyolefin material, such as polyethylene or polypropylene, sized to have longitudinal and lateral dimensions greater than the longitudinal and lateral dimensions of the substrate 20. Preferably, the outer wrap 30 is made of a thin sheet of polypropylene. Thin sheets of polyolefin materials, and in particular thin sheets of polypropylene, are stronger than other plastic materials, typically vinyls, used in the manufacture of casing boards for articles such as loose-leaf binders. Further, polyolefin materials are less brittle, and less susceptible to aging, discoloration and off-setting. Accordingly, thin sheets of polyolefin materials provide greater durability and strength than thin sheets of thermoplastic materials, and in particular vinyl materials. As a result, the outer wrap 30 can be made thinner, typically on the order of 3.5 mils, than similar strength outer wraps made of vinyl materials. Accordingly, material cost, manufacturing cost and weight are reduced.

A significant advantage of polyolefin materials is that they can be adhered directly to the substrate 20 using a conventional adhesive. In contrast, vinyl materials do not adhere well to chipboard or to other thermoplastic materials, including vinyl. Accordingly, the use of polyolefin materials permits the entire surface area of the outer wrap 30 to be affixed, preferably with an adhesive, to the exterior surface 11 of the substrate 20. As a result, little or no air is entrapped between the outer wrap 30 and the substrate 20. Thus, the article can be manufactured without introducing air pockets between the outer wrap 30 and the substrate 20 of the casing board 10. This advantage is not only aesthetically pleasing, but also eliminates sharp edges that provide sites for the initiation of cracks, rips and tears. As previously discussed, because vinyl materials are electronically welded to join the inner cover and the outer cover at their edges along the periphery of the substrate, air pockets inevitably result unless additional manufacturing procedures and controls are established.

Figure 2:
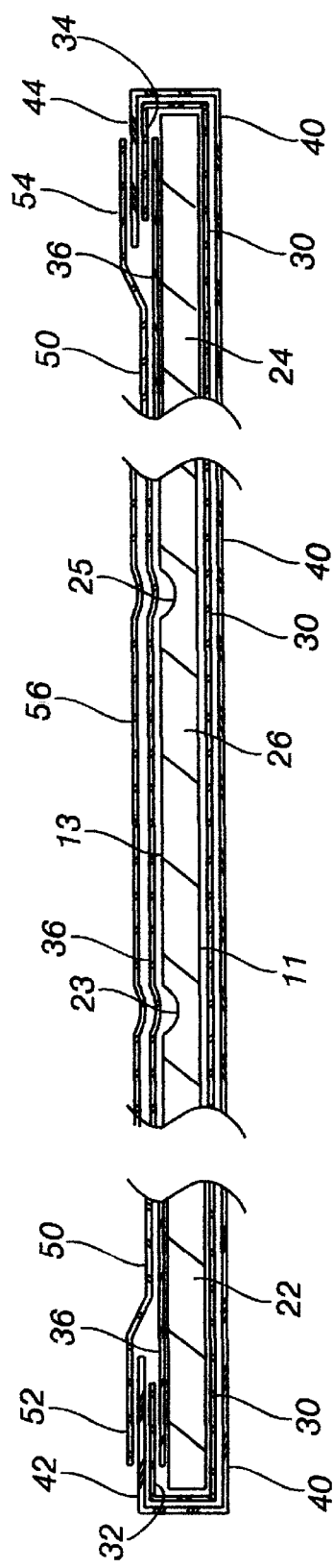
FIG. 2 is a cross-sectional view of the casing board taken along longitudinally extending line 2—2 of FIG. 1.
Figure 3:
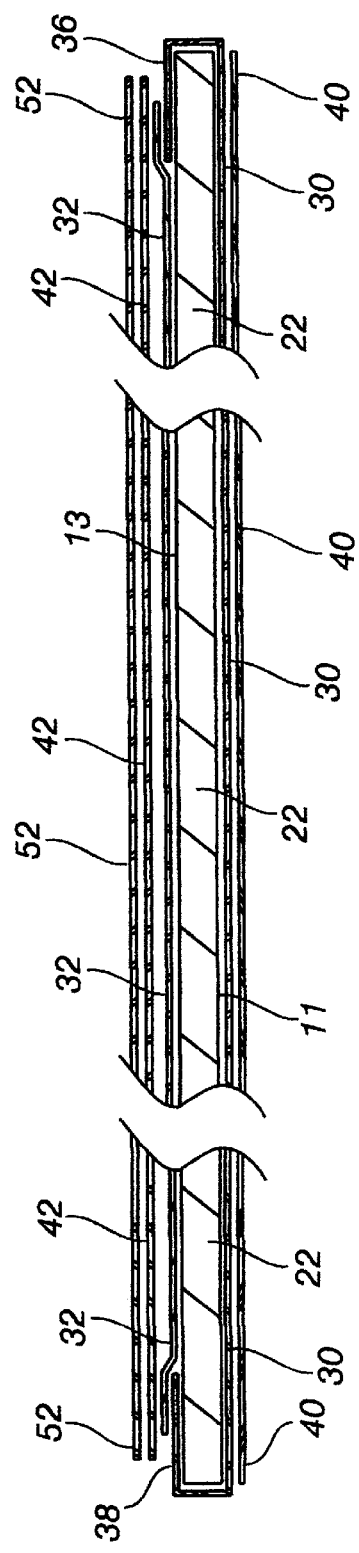
FIG. 3 is a cross-sectional view of the casing board taken along laterally extending line 3—3 of FIG. 1.

As best shown in FIGS. 2 and 3, the longitudinal edges 32, 34 and the lateral edges 36, 38 of the outer wrap 30 that extend beyond the periphery 15 of the substrate 20 are turned over the periphery and affixed to the interior surface 13 of the substrate in a known manner. This construction is commonly referred to as "turned-edge", particularly in the manufacture of loose-leaf binders. Turned-edge construction results in an article of manufacture having smooth, clean edges unlike the sharp edges that result when thin sheets of vinyl are RF welded at their edges along the periphery of the substrate. Accordingly, loose-leaf binders and other articles manufactured using the casing board 10 of the present invention have an aesthetic appearance without sharp edges that provide sites for the initiation of cracks, rips and tears.

It should be appreciated that a significant advantage of turned-edge construction is a reduction in production time, and hence manufacturing cost. Conventional casing board construction made of vinyl requires the edges of the inner and outer covers to be RF welded around the entire periphery 15 and along the hinge lines 23, 25 of the substrate 20. Further, RF welding requires a dwell period to plasticize and fuse the vinyl material. Thus, each substrate 20 sandwiched between an inner and an outer cover must be first moved into position beneath the RF welding apparatus. The RF welding apparatus is then positioned adjacent the seam to be welded and, in some instances, moved along the seam from one end to the other. Once the vinyl materials plasticize and fuse, the RF welding apparatus is removed and the substrate 20 advanced along the production line. In turned-edge construction, the longitudinal edges 32, 34 and lateral edges 36, 38 of the outer wrap 30 are merely turned over the corresponding longitudinal edges 12, 14 and lateral edges 16, 18 of the substrate 20 and affixed thereto, preferably with an adhesive. Accordingly, the production time required to manufacture a casing board 10 made of polyolefin materials and using the turned-edge construction process described herein is significantly less than the time required to manufacture a casing board made of conventional RF welded vinyl materials.

The clear overlay 40 of the casing board 10 is likewise made of a flexible polyolefin material, such as polyethylene or polypropylene. Preferably, the clear overlay 40 is made of a thin sheet of transparent polypropylene. The clear overlay 40 is sized such that it has a longitudinal dimension that is slightly greater than the longitudinal dimension of the substrate 20, but the lateral dimension of the clear overlay is slightly less than the lateral dimension of the substrate. The clear overlay 40 is positioned adjacent the outer wrap 30 on the exterior surface 11 of the substrate 20 such that the outer wrap is sandwiched between the clear overlay and the substrate. As shown in FIGS. 2 and 3, the longitudinal edges 42, 44 of the clear overlay 40 that extend beyond the periphery 15 of the substrate 20 are turned over the periphery and affixed to the corresponding longitudinal edges 32, 34 of the outer wrap 30. As previously discussed, a particular advantage of polyolefin materials, unlike vinyl materials, is that they are susceptible to thermal welding. The longitudinal edges 42, 44 of the clear overlay 40 are thermal welded, and preferably are thermal contact welded using a pair of opposed heated dies, to the corresponding longitudinal edges 32, 34 of the outer wrap 30 on the interior surface 13 of the substrate 20. The clear overlay 40 may, however, be thermal welded to the outer wrap 30 by any known manner, including, for example, the use of hot air thermal welding jets so that the clear overlay is not subjected to possible damage from the heated dies.

Preferably, only the opposed longitudinal edges 42, 44 of the clear overlay 40 are affixed to the outer wrap 30. In an alternative embodiment, however, one of the lateral edges 46, 48, and preferably the lower lateral edge 48, of the clear overlay 40 is affixed to the outer wrap 30 on the interior surface 13 of the substrate 20. In practice, it has been found that the exterior pocket 45 defined by the clear overlay 40 when the overlay is affixed to the interior surface 13 of the substrate 20 along the lower lateral edge 48 has a tendency to wrinkle in the vicinity of the spine portion 26. Although precise control over manufacturing tolerances and processes can eliminate this problem, the additional manufacturing cost is unnecessary and can be avoided by the use of a two-sided pocket. The exterior pocket 45 defined by the clear overlay 40 need only be affixed to the interior surface 13 of the substrate 20 along the longitudinal edges 12, 14 to function properly. The primary purpose of the exterior pocket 45 is to retain and display a single-sheet merchandising insert on the outside of the casing board 10. It has been determined empirically that the static electricity typically present in the merchandising insert is sufficient to hold the single-sheet merchandising insert securely within the exterior pocket 45.

The casing board 10 may optionally be provided with a liner 50 (FIGS. 2 and 3). The liner 50 of the casing board 10 is made of a flexible material, such as a thin sheet of any fabric, paper or plastic. If made of plastic, the liner is preferably made of polypropylene or polyethylene so that the longitudinal edges 52, 54 and lateral edges 56, 58 of the liner can be affixed to the longitudinal edges 32, 34 and lateral edges 36, 38 of the outer wrap 30, or to the longitudinal edges 42, 44 of the clear overlay 40 and the lateral edges 36, 38 of the outer wrap 30 as will be described. The liner 50 is sized such that it has longitudinal and lateral dimensions that are slightly less than the longitudinal and lateral dimensions of the substrate 20. The liner 50 is positioned adjacent the interior surface 13 of the substrate 20 and affixed thereto in any conventional manner, preferably with an adhesive if the liner is made of fabric or paper. The advantage of using a liner 50 made of polypropylene (or any other polyolefin material) is that the central area of the liner may be adhered to the interior surface 13 of the substrate 20 with an adhesive while the longitudinal edges 52, 54 and lateral edges 56, 58 of the liner are thermal welded. Preferably, the longitudinal edges 42, 44 of the clear overlay 40 are thermal welded to the outer wrap 30 on the interior surface 13 of the substrate 20 before the liner 50 is affixed to the interior surface of the substrate. Accordingly, the longitudinal edges 52, 54 of the liner 50 are thermal welded to the corresponding longitudinal edges 42, 44 of the clear overlay 40, and the lateral edges 56, 58 of the liner are thermal welded to the corresponding lateral edges 36, 38 of the outer wrap 30. It may be advantageous for manufacturing reasons, however, to affix the liner 50 to the substrate 20 prior to thermal welding the clear overlay 40 to the outer wrap 30 on the interior surface 13 of the substrate. Accordingly, the longitudinal edges 52, 54 and lateral edges 56, 58 of the liner 50 are thermal welded to the corresponding longitudinal edges 32, 34 and lateral edges 36, 38 of the outer wrap 30.

Figure 4:
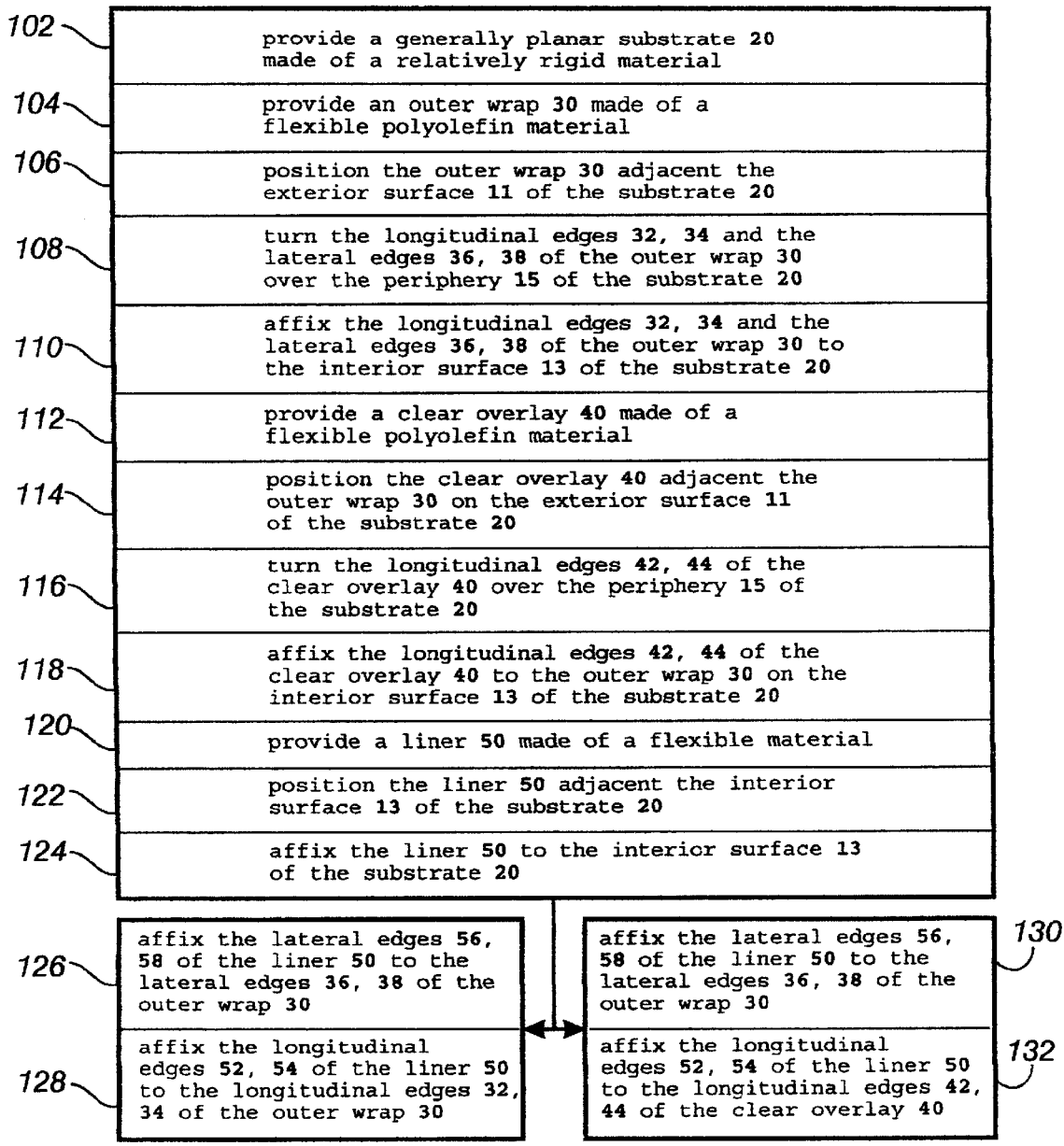
FIG. 4 is a flowchart of the steps of a preferred embodiment of a process according to the present invention for producing the casing board of FIG. 1.

The invention also provides a process 100 for producing a casing board 10 according to the invention. As illustrated by the flowchart of FIG. 4, the process 100 includes the first step 102 of providing a generally planar substrate 20 made of a relatively rigid material. The process 100 includes the second step 104 of providing an outer wrap 30 made of a flexible polyolefin material and having longitudinal and lateral dimensions that are slightly greater than the longitudinal and lateral dimensions of the substrate 20. The process 100 includes the third step 106 of positioning the outer wrap 30 adjacent the exterior surface 11 of the substrate 20 such that the longitudinal edges 32, 34 and the lateral edges 36, 38 of the outer wrap 30 extend beyond the periphery 15 of the substrate 20. The process 100 includes the fourth step 108 of turning the longitudinal edges 32, 34 and lateral edges 36, 38 of the outer wrap 30 over the periphery 15 of the substrate 20. The process 100 includes the fifth step 110 of affixing the longitudinal edges 32, 34 and the lateral edges 36, 38 of the outer wrap 30 to the interior surface 13 of the substrate 20. Preferably, the longitudinal and lateral edges of the outer wrap are affixed to the interior surface of the substrate with an adhesive as previously described.

The process 100 includes the sixth step 112 of providing a clear overlay 40 made of a flexible polyolefin material and having a longitudinal dimension that is slightly greater than the longitudinal dimension of the substrate 20, and a lateral dimension that is slightly less than the lateral dimension of the substrate. The process 100 includes the seventh step 114 of positioning the clear overlay 40 adjacent the outer wrap 30 on the exterior surface 11 of the substrate 20 such that the longitudinal edges 42, 44 of the clear overlay 40 extend beyond the periphery 15 of the substrate 20. The process 100 includes the eighth step 116 of turning the longitudinal edges 42, 44 of the clear overlay 40 over the periphery 15 of the substrate 20 and the ninth step 118 of affixing the longitudinal edges of the clear overlay to the longitudinal edges 32, 34 of the outer wrap 30. Preferably, the longitudinal edges of the clear overlay are affixed to the longitudinal edges of the outer wrap by thermal contact welding, as previously described.

In a preferred embodiment, the process 100 includes the further steps 120 through 124 illustrated by the flowchart in FIG. 4. Specifically, the process 100 includes the tenth step 120 of providing a liner 50 made of a flexible material and having longitudinal and lateral dimensions that are slightly less than the longitudinal and lateral dimensions of the substrate. The process 100 further includes the eleventh step 122 of positioning the liner 50 adjacent the interior surface 13 of the substrate 20 and the twelfth step 124 of affixing the liner 50 to the interior surface of the substrate. Preferably, at least the central area of the liner is affixed to the interior surface of the substrate with an adhesive, as previously described.

In yet another preferred embodiment, the process 100 includes the further steps 126 and 128 illustrated by the flowchart in FIG. 4. Specifically, the process 100 includes the thirteenth step 126 of affixing the lateral edges 56, 58 of the liner 50 to the lateral edges 36, 38 of the outer wrap 30 and the fourteenth step 128 of affixing the longitudinal edges 52, 54 of the liner 50 to the longitudinal edges 32, 34 of the outer wrap 30. In this preferred embodiment, the lateral and longitudinal edges of the liner are preferably affixed to the lateral and longitudinal edges of the outer wrap by thermal contact welding, as previously described.

Alternatively, the process 100 may include the further steps 130 and 132 illustrated by the flowchart in FIG. 4. specifically, the process 100 may include the thirteenth step 130 of affixing the lateral edges 56, 58 of the liner 50 to the lateral edges 36, 38 of the outer wrap 30 and the fourteenth step 132 of affixing the longitudinal edges 52, 54 of the liner 50 to the longitudinal edges 42, 44 of the clear overlay 40. The lateral and longitudinal edges of the liner are preferably affixed to the lateral edges of the outer wrap and to the longitudinal edges of the clear overlay by thermal contact welding, as previously described.

Figure 5:
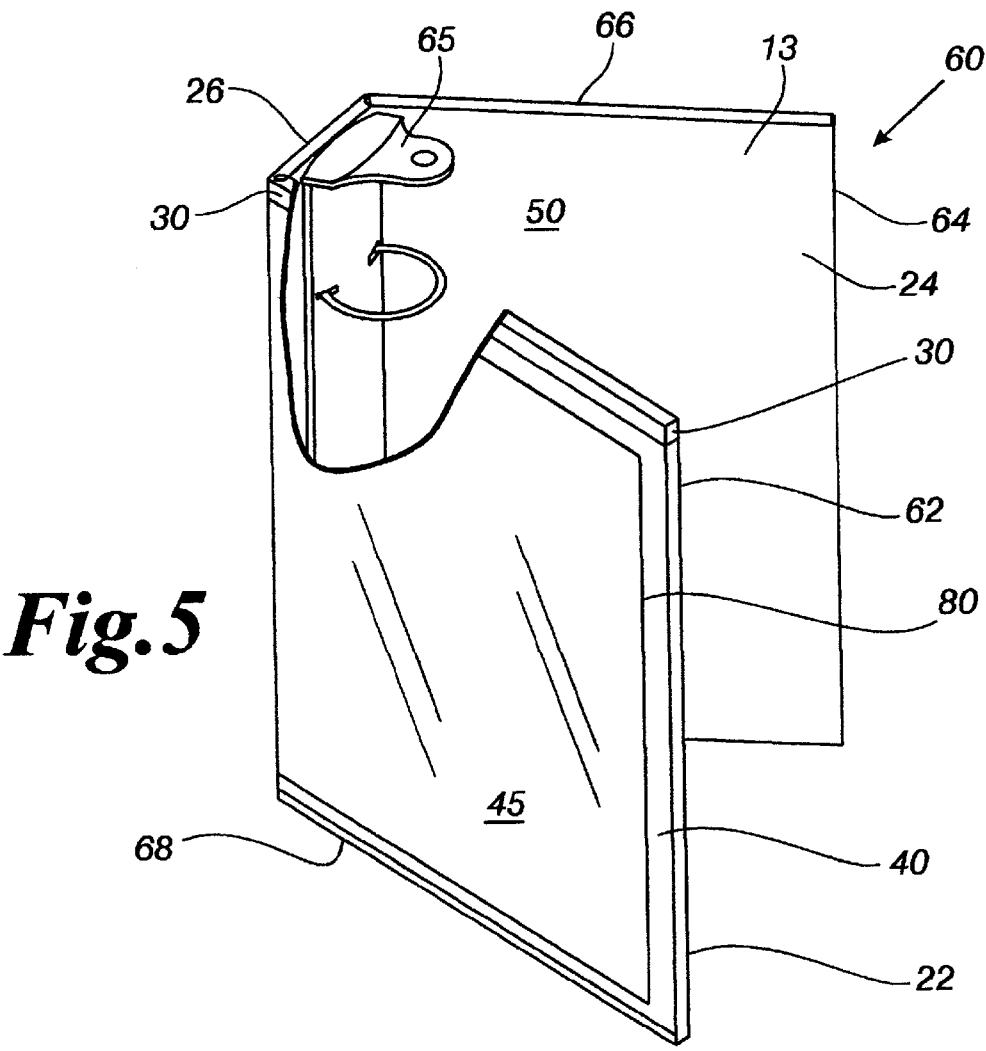
FIG. 5 is a perspective view of an article, namely a loose-leaf binder, manufactured using the casing board and process of the present invention.

As previously mentioned, the casing board 10 is particularly well suited for manufacturing articles such as loose-leaf binders, audio and video cassette cases and compact disc holders. FIG. 5 illustrates a preferred embodiment of the invention wherein the casing board 10 is used in the manufacture of a conventional loose-leaf binder 60. The loose-leaf binder 60 comprises a retainer mechanism 65 fixed to the interior surface 13 of casing board 10. The retainer mechanism 65 may be affixed to the casing board 10 in any known manner. Preferably, however, the retainer mechanism 65 is fixed to the casing board 10 after manufacture utilizing the concealed rivet fastener assembly described in U.S. Pat. No. 5,160,209 to Schuessler. The fastener assembly disclosed in the Schuessler patent provides a loose-leaf binder 60 wherein the rivets for the retainer mechanism 65 are concealed from the outside surface of the binder. Accordingly, the rivets do not interfere with insertion of the single-sheet merchandising insert into the exterior pocket 45 of the binder 60 when the front cover portion 22 and rear cover portion 24 are bent backwards about the hinge lines 23, 25 adjacent the spine portion 26 to open the exterior pocket.

Figure 6:
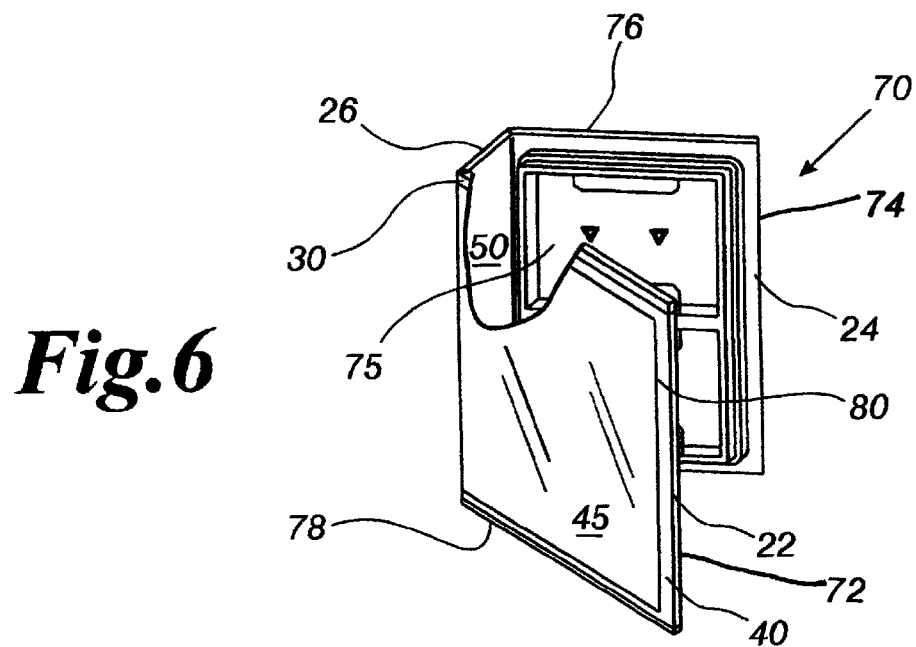
FIG. 6 is a perspective view of another article, namely an audio cassette case, manufactured using the casing board and process of the present invention.

FIG. 6 illustrates another article manufactured using the casing board 10 and the process 100 of the invention. The article is a conventional audio cassette case 70 for organizing, storing, protecting and displaying one or more audio cassettes. The audio cassette case 70 comprises at least one vacuum-formed audio cassette tray 75 affixed to the interior surface 13 of the substrate 20 of the casing board 10 in a conventional manner. The vacuum-formed tray is preferably made of a relatively thick, relatively rigid plastic, and preferably is made of the same material as the outer wrap 30 and clear overlay 40 of the casing board 10, namely polypropylene. The audio cassette case 70 comprises an exterior pocket 45 which is defined by the clear overlay 40 of the casing board 10 such that a single-sheet merchandising insert can be inserted in the exterior pocket 45 and displayed therethrough. Accordingly, the audio cassette case 70 is particularly well suited for rental materials, such as audio and video cassettes distributed by a public library or a retail sale or rental outlet.

It is apparent that the present invention provides a casing board and a process for manufacturing a casing board that exhibits significant advantages over previously known casing boards and processes for producing casing boards. The casing board and process of the present invention permit articles such as portfolios, folders, notebooks, loose-leaf binders, audio and video cassette cases, compact disc holders, game boards and the like to be manufactured using environmentally friendly materials, at reduced material and manufacturing cost, and with the capability to display a single-sheet merchandising insert over the full width of the substrate on the outside of the casing board behind a transparent exterior pocket defined by a clear overlay that extends between the longitudinal edges of the casing board.

In particular, the process of the invention produces a turned-edge, polypropylene, integrally formed casing board including a clear overlay that is thermal welded to an opaque outer wrap to define an exterior transparent pocket on the casing board. The casing board is used to manufacture a clear overlay, polypropylene, turned-edge loose-leaf binder according to the process of the invention which is available from Turned-Edge America of Denver, North Carolina, under the trade name PANAVUE™. The trade name PANAVUE™ is suggestive of the unique feature that enables a single-sheet merchandising insert placed in the exterior pocket to be displayed across the full-width of the outside of the binder.

Obviously, many alternative embodiments of the invention may be devised without departing from the spirit and scope of the invention as disclosed herein. Accordingly, it is intended that the casing board and process for manufacturing the casing board described herein be construed as broadly as possible to encompass all equivalents without departing from the spirit and scope of the invention as disclosed and claimed.

That which is claimed is:

1. A casing board used in the manufacture of articles for organizing, storing, protecting and displaying communications media, such as papers, audio cassettes, video cassettes and compact discs, said casing board comprising:

a substrate made of a relatively rigid material and comprising a front cover portion, a rear cover portion and a spine portion, said spine portion of said substrate positioned between and hingedly connected to said front cover portion and said rear cover portion, said substrate further comprising an exterior surface, an interior surface opposite said exterior surface and a periphery defined by the longitudinal and lateral edges of said substrate;

an outer wrap made of a flexible polyolefin material and having longitudinal and lateral dimensions greater than the longitudinal and lateral dimensions of said substrate, said outer wrap positioned adjacent said exterior surface of said substrate such that the longitudinal and lateral edges of said outer wrap are turned over said periphery of said substrate and affixed to the interior surface thereof; and a clear overlay made of a flexible polyolefin material and having a longitudinal dimension greater than the longitudinal dimension of said substrate, said clear overlay positioned adjacent said outer wrap such that the longitudinal edges of said clear overlay are turned over said periphery of said substrate and affixed to the longitudinal edges of said outer wrap, said clear overlay defining a transparent exterior pocket that extends between the longitudinal edges of the casing board;

wherein the longitudinal edges of said clear overlay are affixed to the longitudinal edges of said outer wrap on said interior surface of said substrate by thermal welding.

2. A casing board according to claim 1 further comprising a liner made of a flexible material and having longitudinal and lateral dimensions less than the longitudinal and lateral dimensions of said substrate, said liner positioned adjacent said interior surface of said substrate and comprising a periphery defined by the longitudinal and lateral edges of said liner.

3. A casing board according to claim 2 wherein the flexible material of said liner is selected from the group consisting of polypropylene and polyethylene.

4. A casing board according to claim 3 wherein said periphery of said liner is affixed to the longitudinal and lateral edges of said outer wrap on said interior surface of said substrate by thermal contact welding.

5. A casing board according to claim 3 wherein said periphery of said liner is affixed to the longitudinal edges of said clear overlay on said interior surface of said substrate by thermal contact welding and to the lateral edges of said outer wrap on said interior surface of said substrate by thermal contact welding.

6. A casing board according to claim 1 wherein the flexible polyolefin material of said outer wrap and said clear overlay are selected from the group consisting of polypropylene and polyethylene.

7. A casing board according to claim 1 wherein said front cover portion, said rear cover portion and said spine portion of said substrate are integrally formed and wherein said substrate is routed laterally between said front cover portion and said spine portion and between said rear cover portion and said spine portion.

8. A casing board according to claim 1 wherein said front cover portion, said rear cover portion and said spine portion of said substrate are integrally formed and wherein said substrate is scored laterally between said front cover portion and said spine portion and between said rear cover portion and said spine portion.

9. A process for producing a casing board used in the manufacture of articles for organizing, storing, protecting and displaying communications media, such as papers, audio cassettes, video cassettes and compact discs, the process comprising the steps of:

providing a generally planar substrate made of a relatively rigid material and comprising a front cover portion, a rear cover portion and a spine portion, the spine portion positioned between and hingedly connected to the front cover portion and the rear cover portion, the substrate further comprising an exterior surface, an interior surface opposite said exterior surface and a periphery defined by the longitudinal and lateral edges of the substrate;

providing an outer wrap made of a flexible polyolefin material and having longitudinal and lateral dimensions greater than the longitudinal and lateral dimensions of the substrate;

positioning the outer wrap adjacent the exterior surface of the substrate such that the longitudinal and lateral edges of the outer wrap extend beyond the periphery of the substrate;

turning the longitudinal and lateral edges of the outer wrap over the periphery of the substrate;

affixing the longitudinal and lateral edges of the outer wrap to the interior surface of the substrate;

providing a clear overlay made of a flexible polyolefin material and having a longitudinal dimension greater than the longitudinal dimension of the substrate;

positioning the clear overlay adjacent the outer wrap such that the longitudinal edges of the clear overlay extend beyond the periphery of the substrate;

turning the longitudinal edges of the clear overlay over the periphery of the substrate;

affixing the longitudinal edges of the clear overlay to the longitudinal edges of the outer wrap such that the clear overlay defines a transparent exterior pocket that extends between the longitudinal edges of the casing board;

wherein the step of affixing the longitudinal edges of the clear overlay to the longitudinal edges of the outer wrap comprises the further step of thermal welding the longitudinal edges of the clear overlay to the longitudinal edges of the outer wrap.

10. The process of claim 9 comprising the further steps of providing a liner made of a flexible material and having longitudinal and lateral dimensions less than the longitudinal and lateral dimensions of the substrate, the liner comprising a periphery defined by the longitudinal and lateral edges of the liner;

positioning the liner adjacent the interior surface of the substrate; and affixing the liner to the interior surface of the substrate.

11. The process of claim 9 wherein the step of providing a generally planar substrate comprises the further step of routing the substrate laterally between the front cover portion and the spine portion and between the rear cover portion and the spine portion.

12. The process of claim 9 wherein the step of providing a generally planar substrate comprises the further step of scoring the substrate laterally between the front cover portion and the spine portion and between the rear cover portion and the spine portion.

13. A binder for organizing, storing, protecting and displaying communications media such as papers, said binder comprising:

a substrate made of a relatively rigid material and comprising a front cover portion, a rear cover portion and a spine portion, said spine portion of said substrate positioned between and hingedly connected to said front cover portion and said rear cover portion, said substrate further comprising an exterior surface, an interior surface opposite said exterior surface and a periphery defined by the longitudinal and lateral edges of said substrate;

an outer wrap made of a flexible polyolefin material and having longitudinal and lateral dimensions greater than the longitudinal and lateral dimensions of said substrate, said outer wrap positioned adjacent said exterior surface of said substrate such that the longitudinal and lateral edges of said outer wrap are turned over said periphery of said substrate and affixed to the interior surface thereof;

a clear overlay made of a flexible polyolefin material and having a longitudinal dimension greater than the longitudinal dimension of said substrate, said clear overlay positioned adjacent said outer wrap such that the longitudinal edges of said clear overlay are turned over said periphery of said substrate and affixed to the longitudinal edges of said outer wrap, said clear overlay defining a transparent exterior pocket that extends between the longitudinal edges of the casing board; and a retaining mechanism affixed to one of said front cover portion, said rear cover portion and said spine portion adjacent said interior surface of said substrate;

wherein the longitudinal edges of said clear overlay are affixed to the longitudinal edges of said outer wrap on said interior surface of said substrate by thermal welding.

14. A case for organizing, storing, protecting and displaying communications media such as papers, said case comprising:

a substrate made of a relatively rigid material and comprising a front cover portion, a rear cover portion and a spine portion, said spine portion of said substrate positioned between and hingedly connected to said front cover portion and said rear cover portion, said substrate further comprising an exterior surface, an interior surface opposite said exterior surface and a periphery defined by the longitudinal and lateral edges of said substrate;

an outer wrap made of a flexible polyolefin material and having longitudinal and lateral dimensions greater than the longitudinal and lateral dimensions of said substrate, said outer wrap positioned adjacent said exterior surface of said substrate such that the longitudinal and lateral edges of said outer wrap are turned over said periphery of said substrate and affixed to the interior surface thereof;

a clear overlay made of a flexible polyolefin material and having a longitudinal dimension greater than the longitudinal dimension of said substrate, said clear overlay positioned adjacent said outer wrap such that the longitudinal edges of said clear overlay are turned over said periphery of said substrate and affixed to the longitudinal edges of said outer wrap, said clear overlay defining a transparent exterior pocket that extends between the longitudinal edges of the casing board; and at least one compartment fixed to one of said front cover portion and said rear cover portion adjacent said interior surface of said substrate;

wherein the longitudinal edges of said clear overlay are affixed to the longitudinal edges of said outer wrap on said interior surface of said substrate by thermal welding.

* * * * *